United States Patent
Li et al.

(10) Patent No.: US 11,190,809 B2
(45) Date of Patent: *Nov. 30, 2021

(54) MODE DEPENDENT INTRA SMOOTHING FILTER TABLE MAPPING METHODS FOR NON-SQUARE PREDICTION UNITS

(71) Applicant: Futurewei Technologies, Inc., Plano, TX (US)

(72) Inventors: Guichun Li, Santa Clara, CA (US); Lingzhi Liu, San Jose, CA (US); Changcai Lai, Shenzhen (CN); Nam Ling, San Jose, CA (US); Jianhua Zheng, Shenzhen (CN); Chen-Xiong Zhang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,776

(22) Filed: Mar. 2, 2020

(65) Prior Publication Data

US 2020/0204830 A1    Jun. 25, 2020

Related U.S. Application Data

(63) Continuation of application No. 16/002,781, filed on Jun. 7, 2018, now Pat. No. 10,645,422, which is a
(Continued)

(51) Int. Cl.
*H04N 19/86* (2014.01)
*H04N 19/159* (2014.01)
(Continued)

(52) U.S. Cl.
CPC ............. *H04N 19/86* (2014.11); *H04N 19/11* (2014.11); *H04N 19/117* (2014.11);
(Continued)

(58) Field of Classification Search
None
See application file for complete search history.

(56) References Cited

U.S. PATENT DOCUMENTS 9,602,839 B2    3/2017   Li et al.
2005/0243911 A1   11/2005   Kwon et al.
(Continued)

FOREIGN PATENT DOCUMENTS

CN    1816149 A    6/2017
CN    101273641 A    6/2017
(Continued)

OTHER PUBLICATIONS

Zheng, Y., et al., "Simplified Intra Smoothing," JCTVC-C234, Oct. 7-15, 2010, 6 pages.
(Continued)

*Primary Examiner* — Chikaodili E Anyikire
(74) *Attorney, Agent, or Firm* — Conley Rose, P.C.

(57) ABSTRACT

An apparatus including a memory operably coupled to a processor. The processor is configured to determine whether to use an intra smoothing filter for a rectangular prediction unit (PU), wherein a width of the rectangular PU is different from a height of the rectangular PU.

35 Claims, 7 Drawing Sheets

Related U.S. Application Data continuation of application No. 15/432,555, filed on Feb. 14, 2017, now Pat. No. 10,015,522, which is a continuation of application No. 13/475,587, filed on May 18, 2012, now Pat. No. 9,602,839.

(60) Provisional application No. 61/497,173, filed on Jun. 15, 2011.

(51) Int. Cl.

| *H04N 19/176* | (2014.01) |
| --- | --- |
| *H04N 19/593* | (2014.01) |
| *H04N 19/11* | (2014.01) |
| *H04N 19/117* | (2014.01) |

(52) U.S. Cl.
CPC ......... *H04N 19/159* (2014.11); *H04N 19/176* (2014.11); *H04N 19/593* (2014.11)

(56) References Cited

U.S. PATENT DOCUMENTS

| 2008/0089417 | A1 | 4/2008 | Bao et al. |
| --- | --- | --- | --- |
| 2009/0046781 | A1 | 2/2009 | Moriya et al. |
| 2011/0038415 | A1 | 2/2011 | Min et al. |
| 2011/0090969 | A1 | 4/2011 | Sung et al. |
| 2012/0082224 | A1* | 4/2012 | Van Der Auwera ........................ H04N 19/176 375/240.12 |
| 2012/0163469 | A1 | 6/2012 | Kim et al. |
| 2012/0307894 | A1 | 12/2012 | Chien et al. |
| 2017/0155925 | A1 | 6/2017 | Li et al. |

FOREIGN PATENT DOCUMENTS

| CN | 101523922 A | 6/2017 |
| --- | --- | --- |
| WO | 2009136743 A2 | 6/2017 |
| WO | 2011021839 A2 | 6/2017 |

OTHER PUBLICATIONS

Sugimoto, K., et al., "LUT-based adaptive filtering on intra prediction samples," JCTVC-D109, Jan. 20-28, 2011, 4 pages.
Sugimoto, K., et al., "LUT-based adaptive filtering on intra prediction samples," JCTVC-D109, Power Point, 13 pages.
Zheng, Y et al., "CE13: Mode Dependent Hybrid Intra Smoothing," JCTVC-D282, Jan. 20-28, 2011, 5 pages.
Zheng, Y., et al., "Mode Dependent Hybrid Intra Smoothing," Power Point, JCTVC D282, Jan. 2011, 9 pages.
Wiegand, T., et al., "WD2: Working Draft 2 of High-Efficiency Video Coding," JCTVC-D503, Jan. 20-28, 2011, 167 pages.
Cao, X., et al., "CE6.b Reporton Short Distance Intra Prediction Method," Power Point, JCTVC-E278, 16 pages.
Zhao, J., et al., "On Intra Coding and MDIS," JCTVC-E437, Mar. 16-23, 2011, 4 pages.
Li, G., et al., "CE6.b.5 Report: Harmonization of SDIP and MDIS," JCTVC-F336, Jul. 14-22, 2011, 4 pages.
Li, G., et al., "Simplification of mode dependent intra smoothing," JCTVC-H0465, Feb. 1-10, 2012, 3 pages.
Liu, L., et al., "Simplification of Mode Dependent Intra Smoothing," JCTVC-H0465, Power Point, 7 pages.
Sugimoto, K., et al., "CE6.f: verification report on LUT-based adaptive filtering on intra prediction samples," JCTVC-E069, Mar. 16-23, 2011, 6 pages.
Xiaoran, C., et al., "CE6.b1 Report om Short Distance Intra Prediction Method," JCTVC-E278, Mar. 16-23, 2011, 7 pages.
Wiegand, T., et al., "WD3: Working Draft 3 of High-Efficiency Video Coding," JCTVC-E603, Feb. 16-23, 2011, 233 pages.
Van Der Auwera, G., et al., "CE6.e: Mode-Dependent Intra Smoothing Modifications," JCTVC-F126, Jul. 14-22, 2011, 6 pages.
Cao, C., et al., "CE6.c Report on Simplification of Short Distance Intra Prediction Method," JCTVC-G556, Nov. 21-30, 2011, 20 pages.
"Series H: Audiovisual and Multimedia Systems, Infrastructure of Audiovisual Services—Coding of Moving Video, Advanced Video Coding for Generic Audiovisual Services," ITUT H.264, Nov. 2007, 564 pages.
Foreign Communication from a Counterpart Application, PCT Application PCT/CN2012/076949, International Search Report dated Dec. 6, 2012, 8 pages.
Foreign Communication From a Counterpart Application, PCT Application PCT/CN2012/076949, Written Opinion dated Dec. 6, 2012, 5 pages.
Foreign Communication From a Counterpart Application, Chinese Application No. 201280029584.4, Chinese Office Action dated Apr. 1, 2016, 3 pages.
Foreign Communication From a Counterpart Application, Chinese Application No. 201280029584.4, Chinese Search Report dated Mar. 22, 2016, 3 pages.
Office Action dated Jun. 11, 2015, 14 pages, U.S. Appl. No. 13/475,587, filed May 18, 2012.
Office Action dated Jan. 4, 2016, 9 pages, U.S. Appl. No. 13/475,587, filed May 18, 2012.
Office Action dated Apr. 15, 2016, 9 pages, U.S. Appl. No. 13/475,587, filed May 18, 2012.
Office Action dated Sep. 20, 2016, 13 pages, U.S. Appl. No. 13/475,587, filed May 18, 2012.
Notice of Allowance dated Nov. 9, 2016, 9 pages, U.S. Appl. No. 13/475,587, filed May 18, 2012.
Office Action dated Oct. 17, 2017, 7 pages, U.S. Appl. No. 15/432,555, filed Feb. 14, 2017.
Notice of Allowance dated Mar. 1, 2018, 14 pages, U.S. Appl. No. 15/432,555, filed Feb. 14, 2017.
Office Action dated Apr. 24, 2019, 16 pages, U.S. Appl. No. 16/002,781, filed Jun. 7, 2018.

\* cited by examiner

MODE DEPENDENT INTRA SMOOTHING FILTER TABLE MAPPING METHODS FOR NON-SQUARE PREDICTION UNITS

CROSS-REFERENCE TO RELATED APPLICATIONS

The present application is a continuation of U.S. patent application Ser. No. 16/002,781, filed Jun. 7, 2018, by Guichun Li, et al., and entitled "Mode Dependent Intra Smoothing Filter Table Mapping Methods for Non-Square Prediction Units," which is a continuation of U.S. Pat. No. 10,015,522, filed Feb. 14, 2017 and issued Jul. 3, 2018, by Guichun Li, et al., and entitled "Mode Dependent Intra Smoothing Filter Table Mapping Methods for Non-Square Prediction Units," which claims priority to U.S. Pat. No. 9,602,839, filed May 18, 2012 and issued Mar. 21, 2017, by Guichun Li, et al., and entitled "Mode Dependent Intra Smoothing Filter Table Mapping Methods for Non-Square Prediction Units," which claims priority to U.S. Provisional Patent Application No. 61/497,173 filed Jun. 15, 2011, by Guichun Li, et al., and entitled "Mode Dependent Intra Smoothing Filter Table Mapping Methods for Non-Square Prediction Units," each of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality without substantially increasing bit-rates are desirable.

SUMMARY

In one embodiment, the disclosure includes an apparatus comprising a memory operably coupled to a processor configured to determine whether to use an intra smoothing filter for a rectangular prediction unit (PU) based on a lookup table (LUT) used for square PUs, wherein a width of the rectangular PU is not equal to a height of the rectangular PU.

In another embodiment, the disclosure includes a method implemented by a processor at least partially implemented in hardware comprising determining whether to use an intra smoothing filter for a rectangular PU based on an LUT used for square PUs, wherein a width of the rectangular PU is not equal to a height of the rectangular PU, and using the intra smoothing filter to code video content.

In yet another embodiment, the disclosure includes an apparatus comprising a memory operably coupled to a processor configured to divide a square coding unit (CU) into a plurality of blocks including a rectangular PU according to a Short Distance Intra Prediction (SDIP) scheme, wherein the width of the rectangular PU is not equal to the height of the rectangular PU; and determine whether to use an intra smoothing filter for the rectangular PU based on an LUT used in Mode Dependent Intra Smoothing (MDIS) for square PUs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
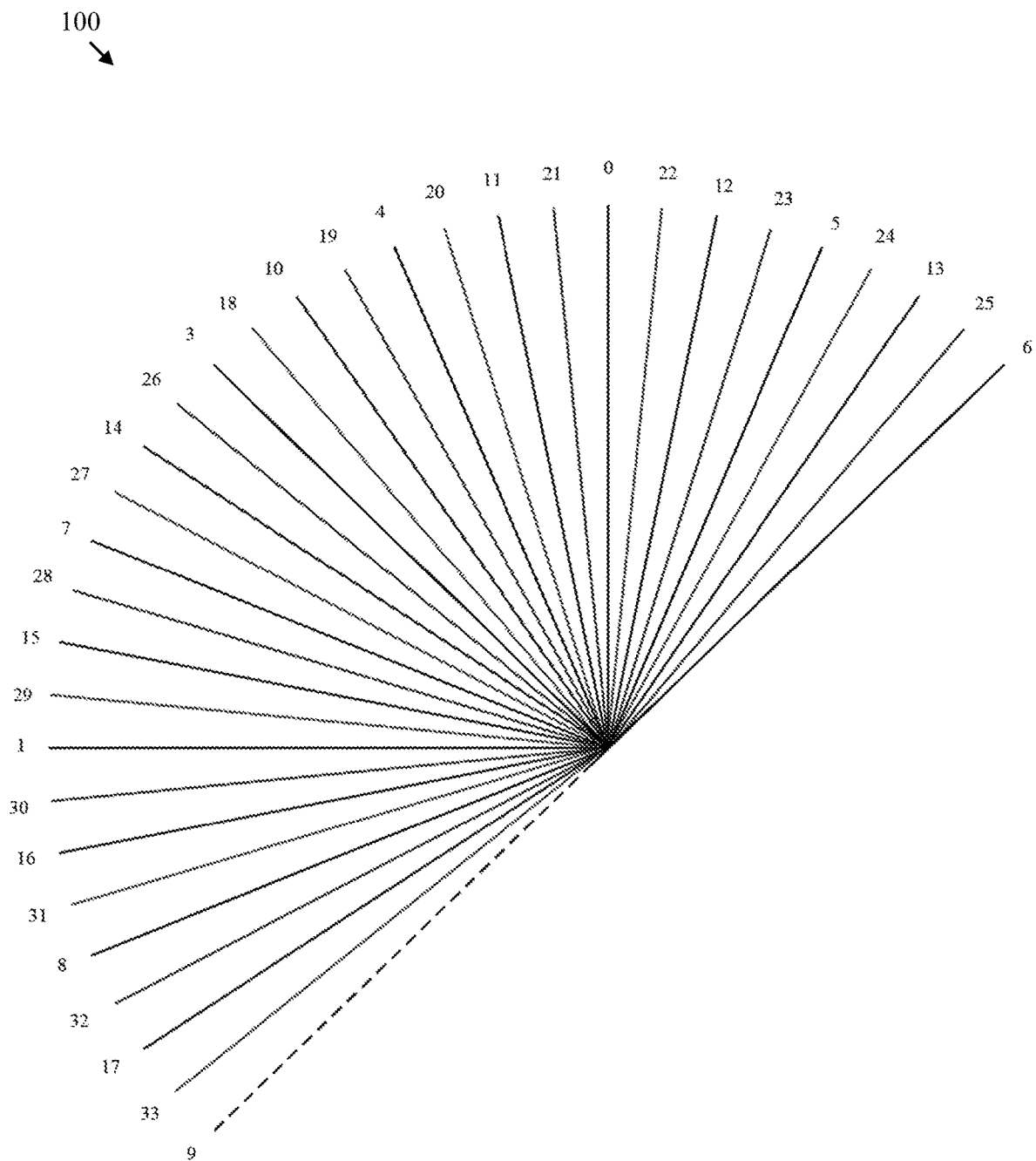
FIG. 1 is a schematic diagram of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, ... or 255) that represents an image quality or characteristic, such as luminance or chrominance, at the corresponding reference point. Typically, groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction (or in short as intra prediction). Intra-frame prediction may reduce spatial redundancies between adjacent and/or neighboring macroblocks (also referred to herein as blocks) in the same frame, thereby compressing the video data without greatly reducing image quality. Different forms of intra-frame prediction have been described by various conventional video/image coding standards, such as the International Telecommunications Union (ITU) Telecommunications Standardization Sector (ITU-T) H.264 (hereinafter, H.264), which is incorporated herein by reference as if reproduced in its entirety.

In practice, intra-frame predication may be implemented by video encoders/decoders (codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone may not reproduce an image of sufficient quality for modern video, and consequently an error correction message, e.g., a residual message, may be communicated between the encoder and decoder to correct differences between the predicted block and the current block. For instance, an encoder may subtract the predicted block from the current block to produce a residual block, which then may be transformed, quantized, and scanned before being coded into the coded data stream. Upon reception of the coded data stream, a decoder may add the reconstructed residual block to the independently generated predicted block to recreate the current block. Although the recreated current block may be an imperfect version of the original current block, e.g., due to the lossy nature of intra-frame coding compression, their differences may be hardly perceptible to the human eye. Thus, substantial bit savings may be derived without significantly degrading the quality of the reconstructed image.

The residual block may comprise few differences between the predicted block and the current block, and therefore many of the residual block's discrete values, e.g., pixel data, may comprise zero and/or near-zero coefficients, e.g., in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra-frame prediction, e.g., each of which may generate a unique texture. For example, the proposed High Efficiency Video Coding (HEVC) video compression standard (also known as H. 265) may employ various prediction modes in a Unified Intra Prediction (UIP) scheme.

FIG. 1 illustrates a schematic diagram of a plurality of intra prediction modes 100 used in the HEVC UIP scheme. For luminance blocks, the intra prediction modes 100 may comprise up to 34 intra prediction modes, which may include 33 directional modes and one non-directional mode, such as a Direct Current (DC) prediction mode. In use, an encoder may select a prediction mode that generates the most accurate prediction for each current block. For example, the sum of absolute errors (SAE) may be calculated for each mode in the intra prediction modes 100, and the one with the least SAE may be selected. In general, more accurate intra prediction may be resulted from a larger number of intra prediction modes. For example, recent research has shown that conventions using 34 intra-frame prediction modes, such as the intra prediction modes 100, may more accurately predict complex textures than conventions using fewer prediction modes, such as H.264, which uses only 9 intra prediction modes. While FIG. 1 shows 34 intra prediction modes, it should be noted that, depending on block-size and/or the intra prediction scheme, any other suitable number of prediction modes may be used.

Despite its coding advantages, intra prediction may carry potential drawbacks. For example, since each prediction block or reconstruction block may be transformed independently with its selected coefficients quantized and then stored/transmitted, the correlation between adjacent blocks may not be considered. As a result, when an encoded video frame is reconstructed, the boundary area belonging to different blocks may be processed differently, creating visible discontinuity, which may be referred as blocking artifacts. The severity of these artifacts depends on different levels of compression. In general, the stronger the intensity of quantization, the more severe the potential artifacts. Such a phenomenon, when prominent, may significantly degrade the video quality.

To reduce blocking artifacts and improve the quality of a reconstructed video frame, an intra smoothing scheme may sometimes be applied to pixels located on block edges. Intra smoothing may employ a deblocking filter to remove or reduce blocking artifacts. The deblocking filter may be applied after an inverse transform in the encoder (e.g. before reconstructing and storing the macroblock for future predictions) and/or in the decoder (e.g. before reconstructing and displaying the macroblock). As a result of intra smoothing, block boundaries may be smoothed, improving the appearance of decoded video frames (particularly at higher compression ratios). Intra smoothing may be applied to vertical and/or horizontal edges of blocks in a macroblock. In many instances, intra smoothing may be applied to both luminance and chrominance data.

Currently, there exists a plurality of intra smoothing schemes. For example, in one scheme, the codec may determine whether to apply a deblocking filter and what deblocking filter to apply, based on the mode of the intra-frame prediction for each current block. This scheme may be referred to as Mode Dependent Intra Smoothing (MDIS). There also exists a plurality of MDIS methods. For example, one MDIS method may explicitly signal whether the prediction samples are filtered. The encoder makes the smoothing decision by testing the Rate-Distortion (RD) cost for all potential intra prediction modes. In an alternative MDIS method, the RD cost of filtered or unfiltered prediction samples may only be tested for the best intra prediction mode, leading to a relatively faster MDIS process.

Traditional block-based intra coding in compression standards, such as Advanced Video Coding (AVC), Key Technical Areas (KTA) and HEVC Test Models (HM), etc., may use only square blocks as prediction units (PU). A prediction unit may refer to an elementary unit for prediction. A square PU comprises a horizontal side (width) that has the same number of pixels as its vertical side (height). A MDIS scheme based on square PUs may determine the ON/OFF status of a filter and/or its type according to a lookup table (LUT). Table 1 shows an examplary LUT, which may be used in HM 3.0 according to "WD3: Working Draft 3 of High-Efficiency Video Coding," by Thomas Wiegand, Woo- Jin Han, Benjamin Bross, Jens-Rainer Ohm, Gary J. Sullivan, in the 5*th Meeting of the Joint Collaborative Team on Video Coding (JCT-VC) of ITU-T SG16 WP3 and ISO/IEC JTC1/SC29/WG*11, Geneva, 16-23 Mar., 2011, Doc. JCTVC-E603, which is hereby incorporated by reference. Table 1 may comprise a plurality of filter decision entries, and each entry may be indexed by a square PU size and intra prediction mode. The rows correspond to all potential sizes of a square PU in intra prediction, where each row represents a unique square PU size (e.g. 2×2, 4×4, etc.). The columns correspond to 34 prediction modes that may be used in a UIP scheme, where each column represents an intra prediction mode numbered according to FIG. 1 (from 0-33). The entries in Table 1 correspond to the filter decisions and represent the numerical assignment of a decision. For each filter decision herein, a number 1 indicates the intra smoothing filter is turned on, and a number 0 indicates the intra smoothing filter is turned off. For example, for a 4×4 square PU with a directional prediction mode of 3, intra smoothing may be performed; for a 64×64 square PU with a directional prediction mode of 5, intra smoothing may not be performed.

16-23 Mar., 2011, Doc. JCTVC-E069, and "CE6.e: Mode-Dependent Intra Smoothing Modifications," by Geert Van der Auwera and Xianglin Wang in the 6*th Meeting of the Joint Collaborative Team on Video Coding (JCT-VC) of ITU-T SG16 WP3 and ISO/IEC JTC1/SC29/WG*11, Torino, 14-22 Jul., 2011, Doc. JCTVC-F126, all of which are hereby incorporated by reference.

In the HEVC standard, an image or video frame may be partitioned into square regions of equal or variable sizes. Each square region may be referred to as a coding unit (CU), which may function as the basic coding unit, similar to the macroblock in the H. 264 standard. A coding unit may contain one or more prediction units. In intra prediction schemes based on square PUs, as described above, the pixels inside a square block may be predicted from the boundaries of neighboring reconstructed blocks located to the upper and/or left sides of the current block. It should be understood that the accuracy of intra prediction may be related to the distance between the predicted pixel and the reference pixel. On average, a smaller distance may lead to higher accuracy. Consequently, in some regions of sequences, the prediction

TABLE 1

A lookup table (LUT) used in the MDIS of HM 3.0

| | Directions | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| Smoothing Filter Switches | 2 × 2 | 0 | 0 | 0 | 0 | 0 | 0 | 0 | 0 | 0 | 0 | 0 | 0 | 0 | 0 | 0 | 0 | 0 | 0 |
| | 4 × 4 | 0 | 0 | 0 | 1 | 0 | 0 | 1 | 0 | 0 | 1 | 0 | 0 | 0 | 0 | 0 | 0 | 0 | 0 |
| | 8 × 8 | 0 | 0 | 0 | 1 | 1 | 1 | 1 | 1 | 1 | 1 | 0 | 0 | 0 | 0 | 0 | 0 | 0 | 0 |
| | 16 × 16 | 0 | 0 | 0 | 1 | 1 | 1 | 1 | 1 | 1 | 1 | 1 | 1 | 1 | 1 | 1 | 1 | 1 | 1 |
| | 32 × 32 | 0 | 0 | 0 | 1 | 1 | 1 | 1 | 1 | 1 | 1 | 1 | 1 | 1 | 1 | 1 | 1 | 1 | 1 |
| | 64 × 64 | 0 | 0 | 0 | 1 | 1 | 0 | 0 | 0 | 0 | 0 | 0 | 0 | 0 | 0 | 0 | 0 | 0 | 0 |
| | 128 × 128 | 0 | 0 | 0 | 0 | 0 | 0 | 0 | 0 | 0 | 0 | 0 | 0 | 0 | 0 | 0 | 0 | 0 | 0 |
| | Directions | 18 | 19 | 20 | 21 | 22 | 23 | 24 | 25 | 26 | 27 | 28 | 29 | 30 | 31 | 32 | 33 | | |
| Smoothing Filter Switches | 2 × 2 | 0 | 0 | 0 | 0 | 0 | 0 | 0 | 0 | 0 | 0 | 0 | 0 | 0 | 0 | 0 | 0 | | |
| | 4 × 4 | 0 | 0 | 0 | 0 | 0 | 0 | 0 | 0 | 0 | 0 | 0 | 0 | 0 | 0 | 0 | 0 | | |
| | 8 × 8 | 0 | 0 | 0 | 0 | 0 | 0 | 0 | 0 | 0 | 0 | 0 | 0 | 0 | 0 | 0 | 0 | | |
| | 16 × 16 | 0 | 0 | 0 | 0 | 0 | 0 | 0 | 0 | 0 | 0 | 0 | 0 | 0 | 0 | 0 | 0 | | |
| | 32 × 32 | 1 | 1 | 1 | 1 | 1 | 1 | 1 | 1 | 1 | 1 | 1 | 1 | 1 | 1 | 1 | 1 | | |
| | 64 × 64 | 0 | 0 | 0 | 0 | 0 | 0 | 0 | 0 | 0 | 0 | 0 | 0 | 0 | 0 | 0 | 0 | | |
| | 128 × 128 | 0 | 0 | 0 | 0 | 0 | 0 | 0 | 0 | 0 | 0 | 0 | 0 | 0 | 0 | 0 | 0 | | |

As illustrated in Table 1, only square PUs are used in this MDIS LUT. It should be noted that for different intra prediction schemes in different video coding conventions, different LUTs may be designed. While Table 1 only shows the ON/OFF status of intra smoothing filters, other LUTs, in addition to the ON/OFF status, may include the selection of a plurality of filter types (e.g. 1=type 1, 2=type 2). Any suitable type of filter, such as a finite impulse response (FIR) filter, an infinite impulse response (IIR) filter, and an intra-coefficient based filter, etc., may be implemented for intra smoothing. For additional examples of LUTs and implementation of intra smoothing filters, please refer to reports entitled "LUT-Based Adaptive Filtering on Intra Prediction Samples," by Kazuo Sugimoto, Shun-ichi Sekiguchi, Akira Minezawa, Kazuhisa Iguchi, and Yoshiaki Shishikui in the 4*th Meeting of the Joint Collaborative Team on Video Coding (JCT-VC) of ITU-T SG16 WP3 and ISO/IEC JTC1/SC29/WG*11, Daegu, KR, 20-28 Jan., 2011, Doc. JCTVC-D109 and "CE6.f: Verification Report on LUT-Based Adaptive Filtering on Intra Prediction Samples," by Kazuo Sugimoto, Shun-ichi Sekiguchi, Akira Minezawa, Kazuhisa Iguchi, and Yoshiaki Shishikui in the 5*th Meeting of the Joint Collaborative Team on Video Coding (JCT-VC) of ITU-T SG16 WP3 and ISO/IEC JTC1/SC29/WG*11, Geneva, for pixels located in the right-bottom part of the current block may be poorer than pixels located in the other parts of the current block. To better exploit spatial correlations of pixels and improve the accuracy of intra prediction, a Short Distance Intra Prediction (SDIP) scheme was first adopted into the HM 3.0 in the 5th JCT-VC meeting held in Geneva in March 2011. The SDIP scheme may divide one (relatively larger) square CU into a plurality of (relatively smaller) rectangular PUs and/or square PUs. A rectangular block (PU) comprises a horizontal side (width) that may have a different number of pixels from its vertical side (height). A rectangular block with height and/or width equal to one may also be referred to herein as a line, and a rectangular block with different width and height may also be referred to herein as a non-square block.

Figure 2:
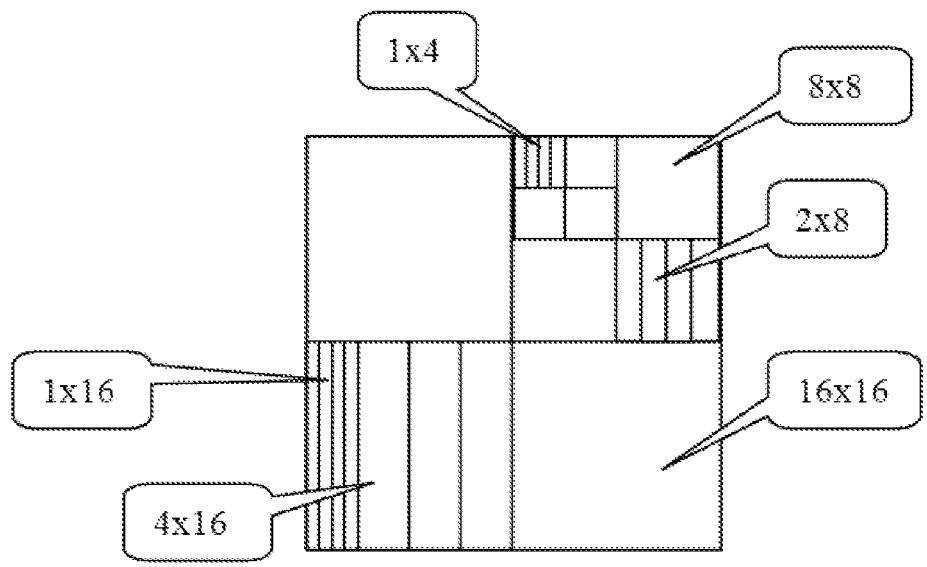
FIG. 2 is an illustration of an exemplary coding unit partitioned into a plurality of rectangular and square prediction units.

FIG. 2 is an illustration of an exemplary coding unit 200 partitioned into a plurality of rectangular and square prediction units according to a SDIP scheme. Suppose, for the purpose of illustration, that the CU 200 has a width of 32 pixels and a height of 32 pixels (hereafter referred as 32×32). There may exist a plurality of possible partitioning arrangements and/or levels within the CU. For example, the 32×32 CU 200 may be divided as four 8×32, 32×8, or 16×16 PUs. Each 16×16 PU may be further divided as four 8×8, 4×16, or 16×4 PUs. Each 16×4 block may be further divided into four 16×1, 8×2, or 4×4 PUs. Each 4×4 block may be further divided into four 1×4, 4×1 or 2×2 PUs. As shown in FIG. 2, the SDIP scheme may include both square and rectangular PUs of varying sizes in a current CU. In use, the RD cost of different partition arraignments may be calculated, and the partition arraignment providing the least RD cost may be selected.

While FIG. 2 shows a 32×32 CU, other sizes of CU may be similarly divided into rectangular PUs of varying sizes. During intra-frame encoding and decoding, pixels may be predicted and reconstructed line-by-line or rectangle-by-rectangle. Due to the adoption of flexible rectangular PUs within a square CU in the SDIP scheme, the distance between the predicted pixel and its reference pixels may be significantly reduced. As a result, the energy of prediction residuals may be reduced, leading to a more accurate intra prediction. The SDIP scheme may potentially use all intra prediction modes available for HEVC, such as the 34 intra prediction modes in FIG. 1. For more details regarding the implementation of SDIP, please refer to report entitled "CE6.b1 Report on Short Distance Intra Prediction Method", by Xiaoran Cao, Xiulian Peng, Changcai Lai, Yunfei Wang, Yongbing Lin, Jizheng Xu, Lingzhi Liu, Jianhua Zheng, Yun He, Haoping Yu, and Feng Wu in the *5th Meeting of the Joint Collaborative Team on Video Coding (JCT-VC) of ITU-T SG16 WP3 and ISO/IEC JTC1/SC29/WG11*, Geneva, 16-23 Mar., 2011, Doc. JCTVC-E278, which is hereby incorporated by reference.

Even though SDIP may help improve the accuracy of intra prediction, it may still require intra smoothing to reduce potential blocking artifacts. However, as described previously, the Mode Dependent Intra Smoothing tool used in HEVC Test Models, prior to the introduction of SDIP, may only be applied to square prediction units. The MDIS may select an intra smoothing filter for a considered square PU based on a lookup table according to the square PU size and the intra prediction mode. The introduction of non-square PUs by the SDIP scheme may lead to potential problems or issues. For example, since the LUT is not indexed by any non-square PU, no intra smoothing filter may be selected for the current non-square PU. Consequently, the existing LUT used in MDIS, as is, may not be used in SDIP. In this case, intra smoothing may have to be performed either on all of the non-square PUs, or on none of the non-square PUs. In practice, this may lead to significant degrading of intra smoothing quality. Further, modifying current LUTs and/or creating new LUTs to fit SDIP may require substantial modifications of current MDIS codes, which may prove complicated and difficult to achieve.

Disclosed herein are systems and methods providing a solution of harmonization for using MDIS in a SDIP scheme. By mapping a rectangular prediction unit to a corresponding square prediction unit, the disclosure may select an intra smoothing filter for any considered rectangular prediction unit using the same filter table (i.e. lookup table) as the original one used in MDIS. A number of mapping methods are proposed. In one method, for example, the width of a current non-square PU may be checked. Then, a square PU having the same width as the current non-square PU may be selected from a LUT and mapped as the corresponding square PU. Other alternative methods may check the height or block-size of the non-square PU in order to map it to a corresponding square PU. After mapping, an intra smoothing filter entry may be selected from the LUT, provided that the intra prediction mode for the current non-square PU may be determined. Depending on the filter entry, a codec may determine whether to apply an intra smoothing filter and/or what type of filter to apply to the current non-square PU. Thus, intra smoothing may be selectively performed for different non-square PUs. By harmonizing MDIS with SDIP, the present disclosure offers novel approaches to take advantage of SDIP, while preserving the usefulness of LUTs already defined in MDIS.

Figure 3:
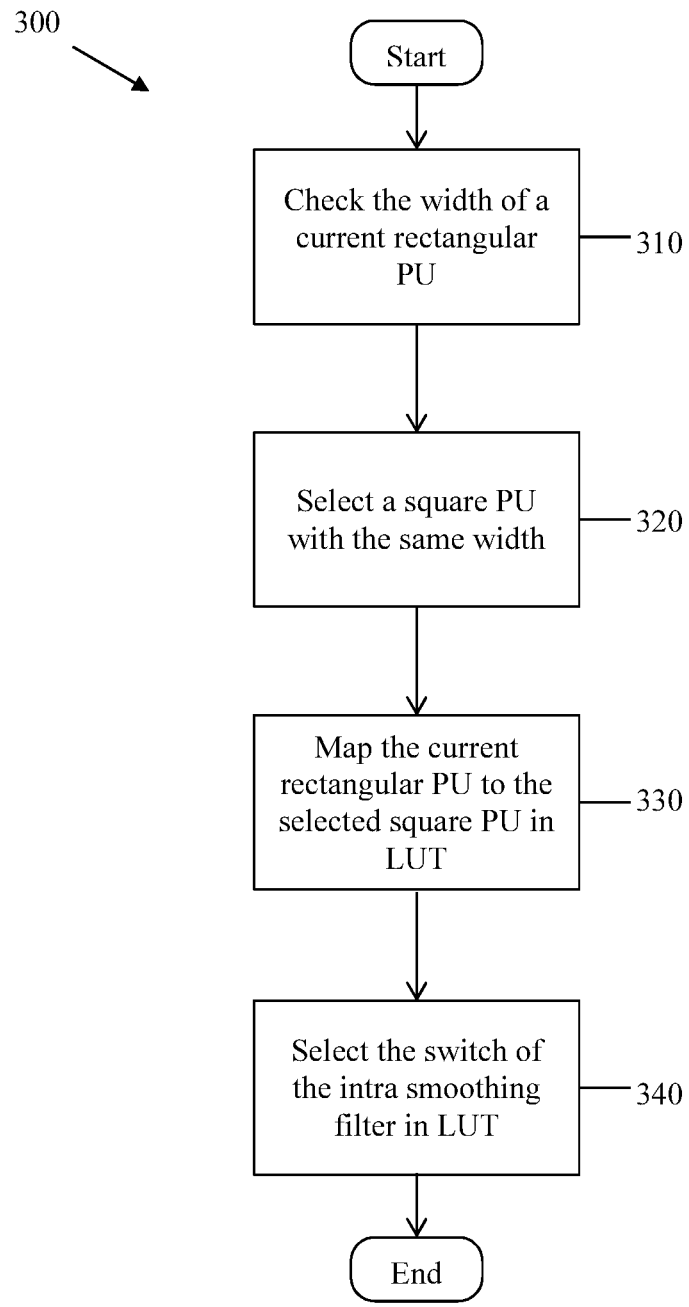
FIG. 3 is a flow chart of an embodiment of a width mapping method.

Suppose, for the purpose of illustration, that in the implementation of SDIP for a considered rectangular prediction unit, an optimal intra prediction mode is determined (e.g. to be one of the 34 modes in FIG. 1), and a MDIS filter table (e.g. Table 1) is available. Now a decision needs to be made regarding whether to apply an intra smoothing filter to the current rectangular PU. The decision may be obtained by a plurality of mapping methods disclosed herein. FIG. 3 illustrates a flow chart of an embodiment of a width mapping method 300. The width mapping method 300 starts in step 310, where the width of the current rectangular PU may be checked. The width (W) herein may refer to the number of pixels in a horizontal dimension of the current rectangular PU. The width may be checked using any suitable known technique. For example, the width may be provided by the SDIP partitioning scheme that created the current rectangular PU.

Next, in step 320, a square PU with the same width as the current rectangular PU may be selected from a MDIS LUT. The square PU may be a PU with N pixels on a horizontal side and N pixels on a vertical side, where N is an integer. A plurality of square PU choices may be available for selection in the LUT, each with a unique width that may be searchable. The codec may be configured to scan through the widths of all available square PUs in the LUT and compare each width with the rectangular PU. When N=W, the corresponding N×N square PU may be selected. A suitable output may be produced signaling the selection.

Next, in step 330, the current rectangular PU may be mapped to the selected square PU in the LUT. Mapping herein may refer to the representation of a non-square PU with a corresponding square PU. The step 330 may allow the LUT to be indexed indirectly by the widths of non-square PUs. Thus, the filter selections may become accessible for non-square PUs. After the step 330, the intra prediction mode and the square PU size, both of which may determine an intra filter entry in the LUT, may now be both known. If desired, the step 330 may be combined with the step 320 into one step, where the rectangular PU may be mapped to a square PU in a LUT with N=W. Next in step 340, the corresponding intra smoothing filter may be selected from the LUT and applied to the current rectangular PU. In certain filter tables, such as the LUT in FIG. 1, the filter decision may simply be a switch determining the ON/OFF status of the filter. If the switch indicates 1, the filter is turned on; if the switch indicates 0, the filter is turned off. It should be noted that other filter decisions may, in addition to the ON/OFF status, comprise various types of intra smoothing filters.

Table 2 shows an embodiment of width mapping of a plurality of rectangular PUs to a corresponding plurality of square PUs. The first column lists rectangular PUs of varying sizes, and the second column lists square PUs of varying sizes. A rectangular PU and a corresponding square PU with the same width may be placed on the same row. For example, both 2×8 and 2×32 rectangular PUs have a width of 2, therefore both may be mapped to a 2×2 square PU which also has a width of 2. While Table 2 only includes a limited number of examplary PU sizes, other PU sizes, such as 2×4, 2×16, 4×8, 4×32, etc., may also be mapped using the disclosed method. Although the width of rectangular PUs used in SDIP typically does not exceed 32, rectangular PUs with widths greater than 32 may also be mapped using the disclosed method. If desired, sometimes the intra smoothing filters for certain widths of rectangular PU (especially small widths such as 1, 2, or 4) may be manually switched off regardless of the intra prediction mode. For example, in the case of Table 2, no filtering may be applied to rectangular PUs (e.g. 1×4, 1×16) with width of 1. In other cases, it is possible that no filtering may be applied to rectangular PUs with width smaller or equal to 4.

TABLE 2

Width mapping table

| Rectangular PUs | Square PUs |
|---|---|
| 1 × 4, 1 × 16 | No Filtering |
| 2 × 8, 2 × 32 | 2 × 2 |
| 4 × 1, 4 × 16 | 4 × 4 |
| 8 × 2, 8 × 32 | 8 × 8 |
| 16 × 1, 16 × 4 | 16 × 16 |
| 32 × 2, 32 × 8 | 32 × 32 |
| N/A | 64 × 64 |

Figure 4:
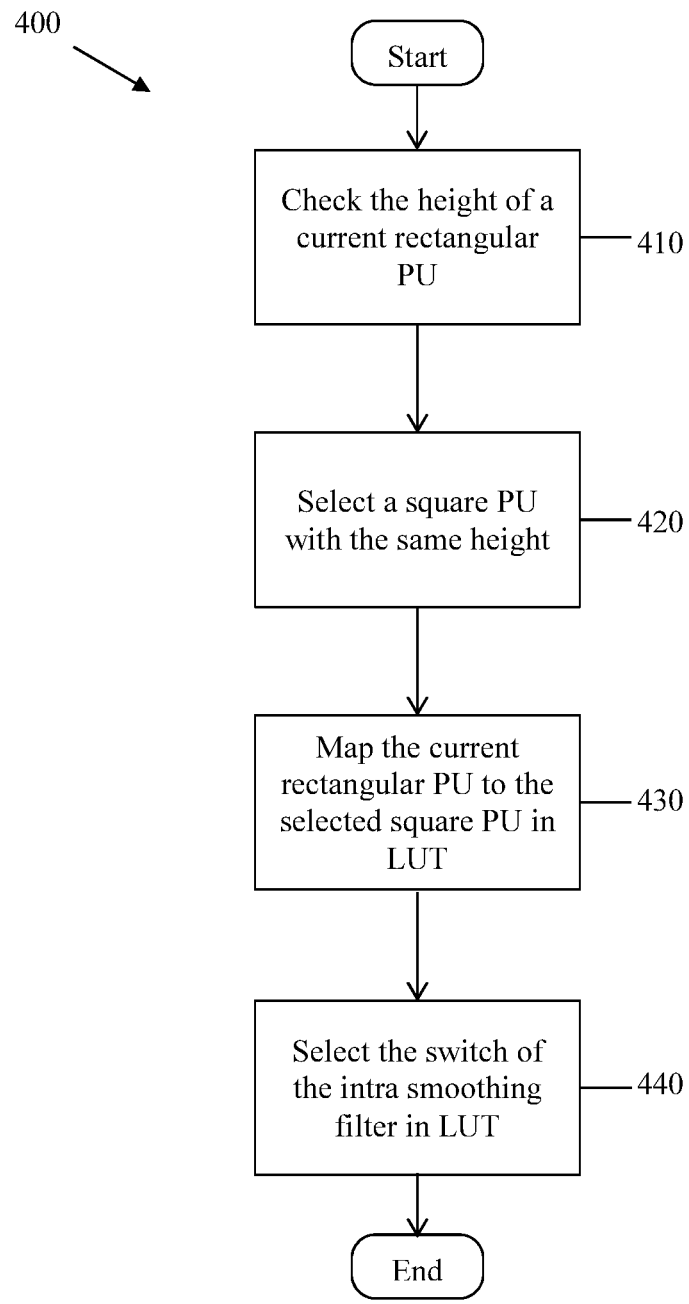
FIG. 4 is a flow chart of an embodiment of a height mapping method.

FIG. 4 illustrates a flow chart of an embodiment of a height mapping method 400. The height mapping method 400 starts in step 410, where the height of the current rectangular PU may be checked. The height (H) herein may refer to the number of pixels in a vertical dimension of the current rectangular PU. The height may be checked using any suitable known technique. For example, the height may be provided by the SDIP partitioning scheme that created the current rectangular PU. Next, in step 420, a square PU with the same height as the current rectangular PU may be selected from a MDIS LUT. The codec may be configured to scan through the heights of all available square PUs in the LUT and compare each height with the rectangular PU. When N=H, the corresponding N×N square PU may be selected. Next, in step 430, the current rectangular PU may be mapped to the selected square PU in the LUT. The step 430 may allow the LUT to be indexed indirectly by the heights of non-square PUs. Next in step 440, the corresponding intra smoothing filter may be selected from the LUT and applied to the current rectangular PU.

Table 3 shows an embodiment of height mapping of a plurality of rectangular PUs to a corresponding plurality of square PUs. A rectangular PU and a corresponding square PU with the same height may be placed on the same row. For example, both 16×4 and 1×4 rectangular PUs have a height of 4, therefore both may be mapped to a 4×4 square PU which also has a height of 4. While Table 3 only includes a limited number of exemplary PU sizes, other PU sizes, such as 2×4, 2×16, 4×8, 4×32, etc., may also be mapped using the disclosed method. Although the height of rectangular PUs used in SDIP typically does not exceed 32, rectangular PUs with heights greater than 32 may also be mapped using the disclosed method. If desired, sometimes the intra smoothing filters for certain heights of rectangular PU (especially small heights such as 1, 2, or 4) may be manually switched off regardless of the intra prediction mode. For example, in the case of Table 3, no filtering may be applied to rectangular PUs (e.g. 4×1, 16×1) with height of 1. In other cases, it is possible that no filtering may be applied to rectangular PUs with height smaller or equal to 4.

TABLE 3

Height mapping table

| Rectangular PUs | Square PUs |
|---|---|
| 4 × 1, 16 × 1 | No Filtering |
| 8 × 2, 32 × 2 | 2 × 2 |
| 16 × 4, 1 × 4 | 4 × 4 |
| 2 × 8, 32 × 8 | 8 × 8 |
| 1 × 16, 4 × 16 | 16 × 16 |
| 2 × 32, 8 × 32 | 32 × 32 |
| N/A | 64 × 64 |
| N/A | 128 × 128 |

Figure 5:
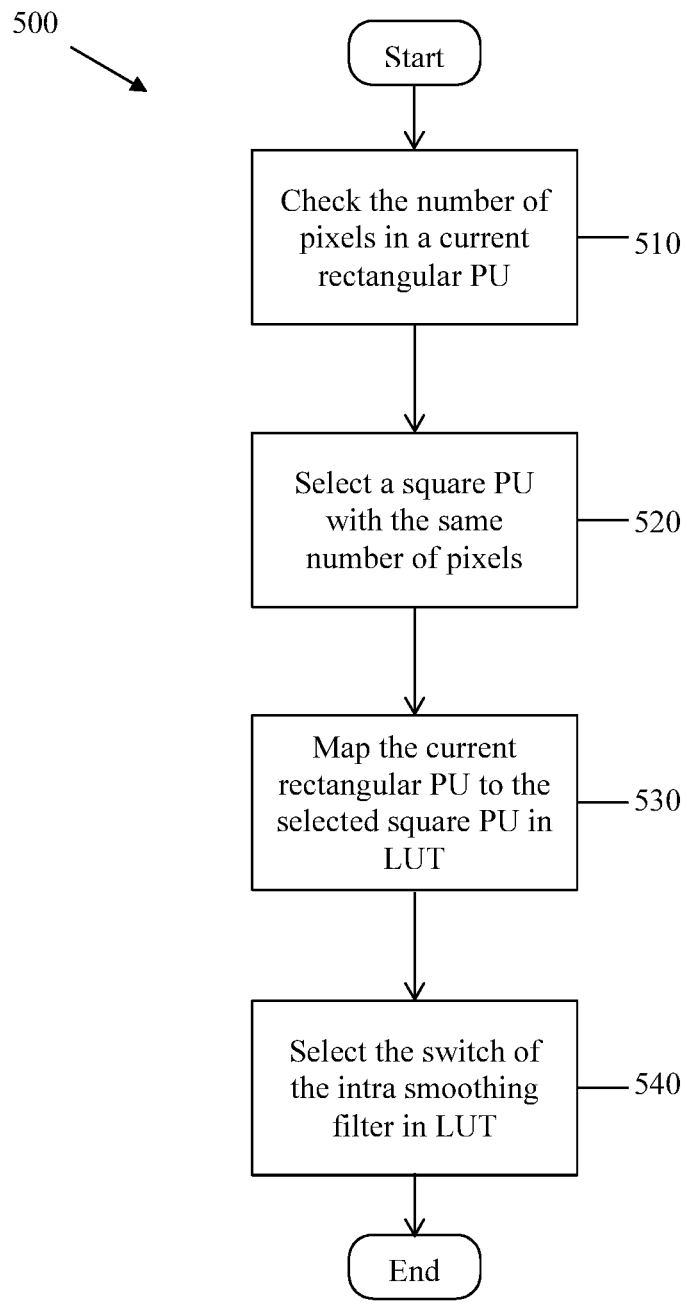
FIG. 5 is a flow chart of an embodiment of a block-size mapping method.

FIG. 5 illustrates a flow chart of an embodiment of a block-size mapping method 500. The block-size mapping method 500 starts in step 510, where the block-size of the current rectangular PU may be checked. The block-size (W×H) herein may refer to the number of pixels enclosed in the current rectangular PU. The block-size may be checked using any suitable known technique. For example, the block-size may be provided by the SDIP partitioning scheme that created the current rectangular PU. Next, in step 520, a square PU with the same block-size as the current rectangular PU may be selected from a MDIS LUT. The codec may be configured to calculate the block-sizes of all available square PUs in the LUT and compare each block-size with the rectangular PU. When N×N=W×H, the corresponding square PU may be selected. Next, in step 530, the current rectangular PU may be mapped to the selected square PU in the LUT. The step 530 may allow the LUT to be indexed indirectly by the block-sizes of non-square PUs. Next in step 540, the corresponding intra smoothing filter may be selected from the LUT and applied to the current rectangular PU.

Table 4 shows an embodiment of block-size mapping of a plurality of rectangular PUs to a corresponding plurality of square PUs. A rectangular PU and a corresponding square PU with the same block-size may be placed on the same row. For example, all 4×16, 16×4, 2×32, and 32×2 rectangular PUs have a block-size of 64, therefore all of these PUs may be mapped to a 8×8 square PU which also has a block-size of 64. While Table 4 only includes a limited number of examplary PU sizes, other PU sizes, such as 2×4, 2×16, 4×8, 4×32, etc., may also be mapped in the disclosed method.

TABLE 4

Block-size mapping table

| Rectangular PUs | Square PUs |
|---|---|
| 1 × 4, 4 × 1 | 2 × 2 |
| 2 × 8, 8 × 2, 1 × 16, 16 × 1 | 4 × 4 |
| 4 × 16, 16 × 4, 2 × 32, 32 × 2 | 8 × 8 |
| 8 × 32, 32 × 8 | 16 × 16 |
| N/A | 32 × 32 |
| N/A | 64 × 64 |
| N/A | 128 × 128 |

While FIGS. 3-5 and Table 2-4 above only include embodiments of a limited number of mapping methods, other mapping methods may also be used for the present disclosure. For example, a partial compilation of possible mapping methods is listed as follows:
1) Width mapping;
2) Height mapping;
3) Width mapping, no filtering when width==1;
4) Height mapping, no filtering for height==1;

5) Width mapping, no filtering when width==1 or height==1;
6) Height mapping, no filtering when width==1 or height==1;
7) Width mapping, no filtering when width≤4;
8) Height mapping, no filtering when height≤4;
9) Width mapping, no filtering when width≤4 or height≤4;
10) Height mapping, no filtering when width≤4 or height≤4;
11) Width mapping or height mapping, whichever has greater value;
12) Block-size mapping;
13) Block-size mapping, no filtering when width==1 or height==1;
14) Block-size mapping, no filtering when width≤4 or height≤4;

In practice, each of the plurality of mapping methods listed above may be tested, and the method providing the best overall performance may be chosen as the optimal mapping method. In the implementation of a codec, the optimal mapping method may be used for all rectangular PUs of a SDIP scheme. To evaluate the performance of the mapping methods, simulations may be conducted to compare the disclosed methods with existing HM anchors. For example, a width mapping method was incorporated into a simulation, and its results will be discussed below. Table 5 shows another embodiment of width mapping of rectangular PUs to square PUs, which was used in the tests. Table 5 may be similar to Table 2, except that when the width of rectangular PUs is less than or equal to 4, no intra filtering may be applied regardless of intra prediction modes.

TABLE 5

Width mapping table with no filtering for width ≤ 4

| Rectangular PUs | Square PUs |
|---|---|
| 1 × 16 | No Filtering |
| 2 × 8 | No Filtering |
| 4 × 16 | No Filtering |
| 8 × 2, 8 × 32 | 8 × 8 |
| 16 × 1, 16 × 4 | 16 × 16 |
| 32 × 8 | 32 × 32 |
| N/A | 64 × 64 |

Simulations using the width mapping method in Table 5 were applied for intra-frame entropy coding, where both Intra High Efficiency (HE) and Intra Low Complexity (LC) configurations were tested for performance evaluation. Testing results showed the average percentage RD costs on a plurality of resolution classes (Classes A, B, C, D, and E) for the three components of color space (Y, U, and V). In the simulation, the RD performances of three different cases (Case-1 to Case-3) were analyzed, which will be discussed in Tables 6-8 respectively.

Table 6 shows the testing result of Case-1 (SDIP=0, MDIS=0, SDIP-MDIS=0) in comparison to a HM 3.0 anchor. Herein SDIP=0 indicates that no SDIP scheme was implemented, MDIS=0 indicates that no intra smoothing was performed, and SDIP-MDIS=0 indicates that no width mapping of the present disclosure was incorporated. The HM 3.0 anchor included a conventional MDIS scheme but no SDIP scheme. Thus, compared to the HM 3.0 anchor, the only difference of Case-1 was that the MDIS had been disabled. The average RD costs of Case-1 were found to increase for all YUV components. For example, the average RD cost of all resolution classes increased by about 0.17% for the Y-luma component in Intra HE. The increase in RD cost indicated the requirement for a higher bitrate with the same amount of video distortion, which signaled a reduced quality of video coding. However, without the MDIS, the encryption (Enc) and decryption (Dec) times either remained the same for Intra HE, or decreased by a small amount (about 2%) for Intra LC.

Table 7 shows the testing result of Case-2 (SDIP=1, MDIS=0, SDIP-MDIS=0) in comparison to a HM 3.0-SDIP anchor. Herein SDIP=1 indicates that a SDIP scheme was implemented, MDIS=0 indicates that no intra smoothing was performed, and SDIP-MDIS=0 indicates that no width mapping of the present disclosure was incorporated. The HM 3.0-SDIP anchor included a conventional MDIS scheme and a SDIP scheme. However, as discussed previously, the conventional MDIS were not able to perform intra smoothing on non-square PUs created by the SDIP scheme. Thus, in the HM 3.0-SDIP anchor, intra smoothing was performed only on square PUs. Compared to the HM 3.0-SDIP anchor, the only difference of Case-2 was that the MDIS for square PUs had been disabled. The average RD costs of Case-2 were found to increase for all YUV components. For example, the average RD cost of all resolution classes increased by about 0.18% for the Y-luma component in Intra HE. The increase in RD cost indicated a reduced quality of video coding. However, without the MDIS, the Enc and Dec times decreased by a small amount for both Intra HE (about 1%) and Intra LC (about 3%).

Table 8 shows the testing result of Case-3 (SDIP=1, MDIS=1, SDIP-MDIS=1) in comparison to a HM 3.0-SDIP anchor. Herein SDIP=1 indicates that a SDIP scheme was implemented, MDIS=1 indicates that MDIS was implemented, and SDIP-MDIS=1 indicates that the width mapping of the present disclosure was incorporated. The HM 3.0-SDIP anchor included a conventional MDIS scheme and a SDIP scheme. However, as discussed previously, the conventional MDIS was not able to perform intra smoothing on non-square PUs created by the SDIP scheme. Thus, in the HM 3.0-SDIP anchor, intra smoothing was performed only on square PUs. Compared to the HM 3.0-SDIP anchor, the only difference of Case-3 was that, by using the width mapping method (as described with respect to Table 5), MDIS was performed on all square and non-square PUs. The average RD costs of Case-3 were almost the same as the HM 3.0 anchor for all YUV components. For example, the average RD cost of all resolution classes remained the same for the Y-luma component in Intra HE, and dropped slightly by 0.02% for the Y-luma component in Intra HE. The stability (or slight decrease) in RD cost indicated the same (or slightly improved) quality of video coding. Further, with the harmonization of SDIP and MDIS, the Enc and Dec times remained constant for both Intra HE and Intra LC.

TABLE 6

RD performance of Case-1 (SDIP = 0, MDIS = 0, SDIP − MDIS = 0) compared with the HM 3.0 anchor

| | All Intra HE | | | All Intra LC | | |
|---|---|---|---|---|---|---|
| | Y | U | V | Y | U | V |
| Class A | 0.41 | 0.42 | 0.60 | 0.66 | 0.48 | 0.79 |
| Class B | 0.22 | 0.27 | 0.25 | 0.35 | 0.23 | 0.23 |
| Class C | −0.12 | −0.03 | 0.00 | −0.32 | −0.16 | −0.13 |
| Class D | 0.06 | 0.18 | 0.22 | 0.13 | 0.09 | 0.15 |
| Class E | 0.32 | 0.52 | 0.56 | 0.62 | 0.51 | 0.48 |
| Overall | 0.17 | 0.26 | 0.31 | 0.28 | 0.22 | 0.29 |
| Enc Time[%] | | 100% | | | 98% | |
| Dec Time[%] | | 100% | | | 98% | |

TABLE 7

RD performance of Case-2 (SDIP = 1, MDIS = 0, SDIP − MDIS = 0) compared with the HM 3.0-SDIP anchor

| | All Intra HE | | | All Intra LC | | |
|---|---|---|---|---|---|---|
| | Y | U | V | Y | U | V |
| Class A | 0.37 | 0.22 | 0.51 | 0.53 | 0.25 | 0.47 |
| Class B | 0.20 | 0.27 | 0.23 | 0.29 | 0.21 | 0.25 |
| Class C | −0.04 | 0.09 | 0.11 | −0.06 | 0.10 | 0.04 |
| Class D | 0.06 | 0.19 | 0.12 | 0.12 | 0.10 | 0.08 |
| Class E | 0.36 | 0.42 | 0.30 | 0.59 | 0.39 | 0.38 |
| Overall | 0.18 | 0.23 | 0.25 | 0.28 | 0.20 | 0.24 |
| Enc Time[%] | | 99% | | | 97% | |
| Dec Time[%] | | 99% | | | 97% | |

TABLE 8

RD performance of Case-3 (SDIP = 1, MDIS = 1, SDIP − MDIS = 1) compared with the HM 3.0-SDIP anchor

| | All Intra HE | | | All Intra LC | | |
|---|---|---|---|---|---|---|
| | Y | U | V | Y | U | V |
| Class A | −0.04 | −0.19 | −0.14 | −0.12 | −0.04 | −0.12 |
| Class B | 0.00 | 0.04 | 0.04 | −0.02 | 0.07 | 0.09 |
| Class C | 0.04 | 0.06 | 0.04 | 0.08 | 0.02 | 0.04 |
| Class D | −0.01 | 0.03 | −0.05 | −0.01 | 0.01 | −0.01 |
| Class E | 0.03 | −0.07 | 0.00 | 0.02 | 0.13 | 0.10 |
| Overall | 0.00 | −0.02 | −0.02 | −0.01 | 0.03 | 0.02 |
| Enc Time[%] | | 100% | | | 100% | |
| Dec Time[%] | | 100% | | | 100% | |

The simulation results in Tables 6-8 demonstrate that, when MDIS was disabled (Case-1) or only partially applied to square PUs of a SDIP scheme (Case-2), the RD costs increased by a small amount in comparison to the HM 3.0 and HM 3.0-SDIP anchors respectively. When MDIS is consistently applied to all square and non-square PUs (Case-3), the RD costs essentially remain the same. For more details regarding the simulation tests above, please refer to report entitled "CE6.b.5 Report: Harmonization of SDIP and MDIS," by Guichun Li, Lingzhi Liu, Changcai Lai, Nam Ling, Jianhua Zheng, and Philipp Zhang in the 6*th Meeting of the Joint Collaborative Team on Video Coding (JCT-VC) of ITU-T SG*16 *WP*3 *and ISO/IEC JTC*1*/SC*29*/WG*11, Torino, IT, 14-22 Jul., 2011, Doc. JCTVC-F336, which is hereby incorporated by reference.

Although the harmonization of MDIS with SDIP may not result in significant coding gain, it may at least maintain (if not slightly improve) the coding performance while making the intra smoothing process consistent for both square PUs and non-square PUs. The consistency of intra smoothing may lead to a more effective reduction of blocking artifacts. Further, higher accuracy of intra prediction enabled by SDIP may also help improve the subjective quality of decoded videos.

Figure 6:
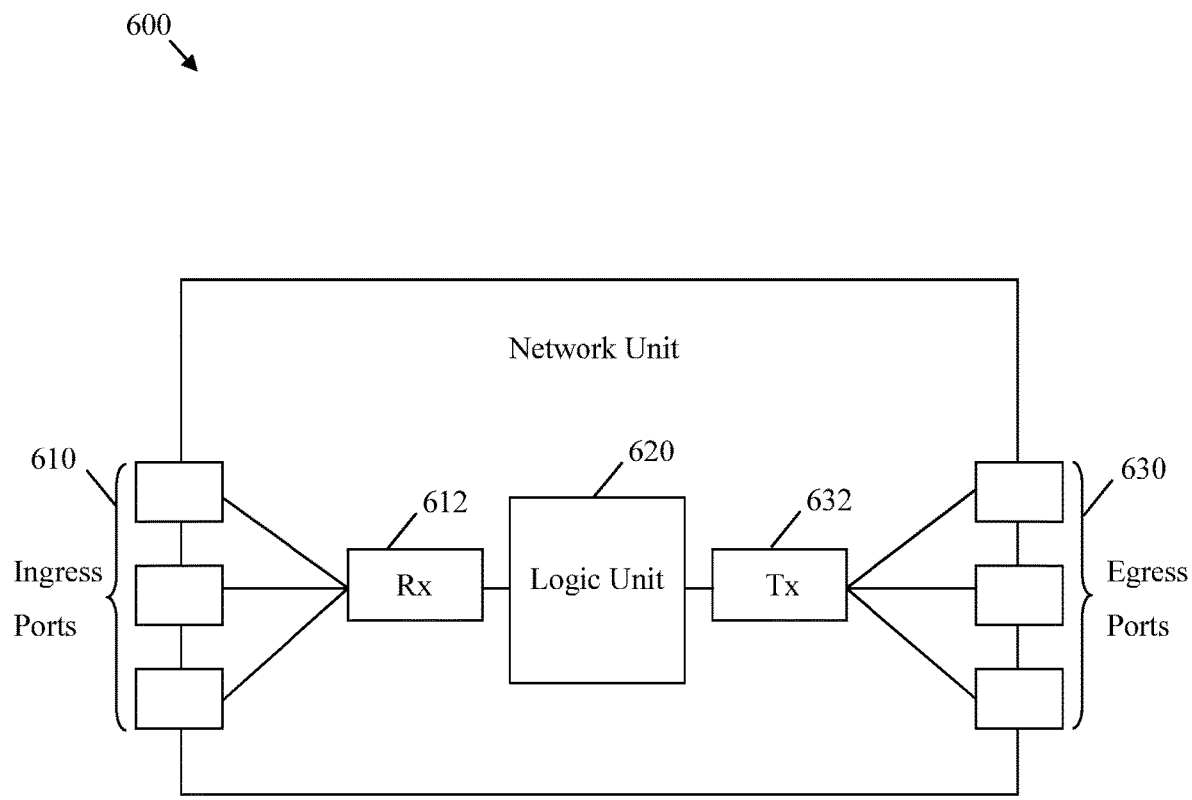
FIG. 6 is a schematic diagram of an embodiment of a network unit.

FIG. 6 illustrates an embodiment of a network unit 600, which may comprise a processor or a video/image codec that processes images and predicts blocks as described above, e.g., within a network or system. For instance, the network unit 600 may correspond to a media controller at an image transmitter and/or receiver. The network unit 600 may comprise a plurality of ingress ports 610 and/or receiver units 612 for receiving data from other codecs, logic unit or processor 620 to process images and determine which codecs to send the data to, and a plurality of egress ports 630 and/or transmitter units 632 for transmitting data to the other codecs. The logic unit or processor 620 may be configured to implement any of the schemes described herein, such as the width mapping method 300, and may be implemented using hardware, software, or both.

Figure 7:
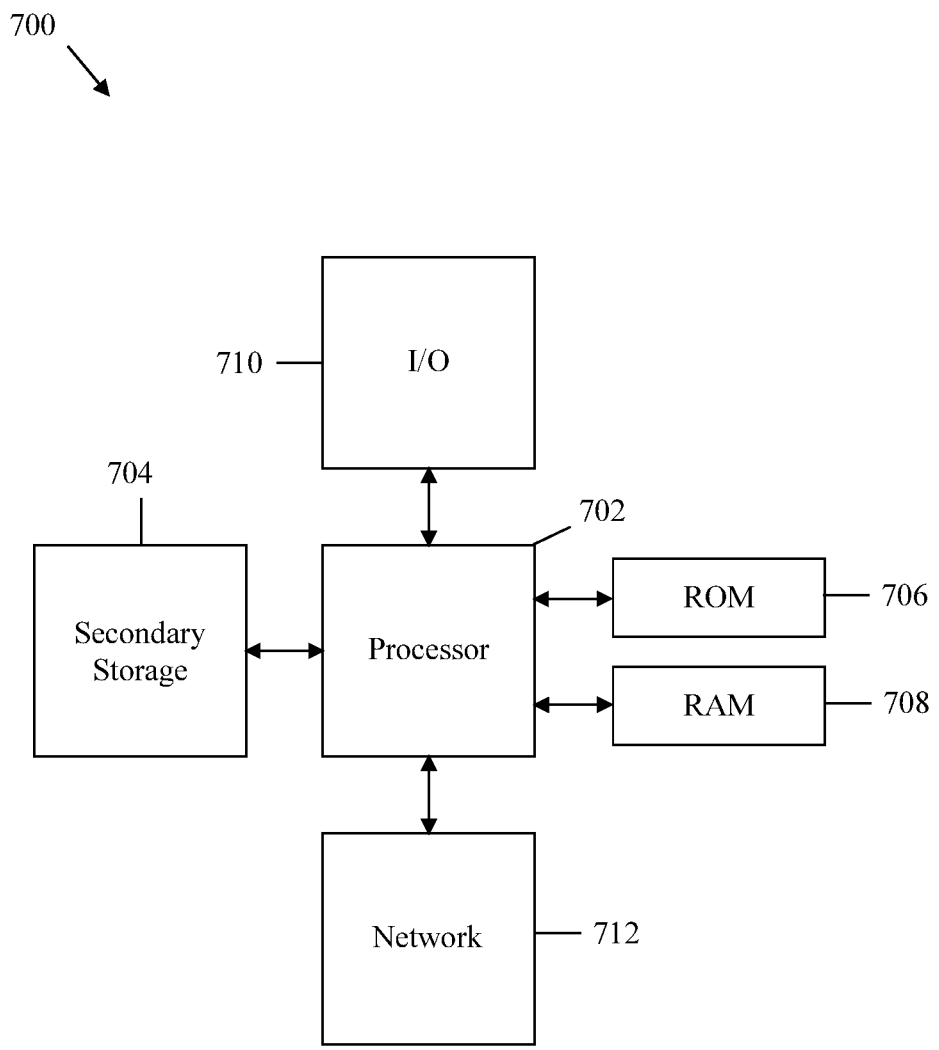
FIG. 7 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 7 illustrates a typical, general-purpose network component or computer system 700 suitable for implementing one or more embodiments of the methods disclosed herein, such as the width mapping method 300. The general-purpose network component or computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs) and/or digital signal processors (DSPs). The processor 702 may be configured to implement any of the schemes described herein, including the width mapping method 300, which may be implemented using hardware, software, or both.

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a memory having stored computer instructions; and
    a processor operably coupled to retrieve and execute the computer instructions from the memory to perform the following steps:
        determine whether a plurality of conditions are satisfied, the plurality of conditions comprising a block size of a rectangular prediction unit (PU) being greater than a defined size;
        determine whether to use an intra smoothing filter for the rectangular PU based on whether the plurality of conditions are satisfied, wherein a width of the rectangular PU is different from a height of the rectangular PU; and
        apply the intra smoothing filter while performing intra prediction processing for the rectangular PU in response to determining to use the intra smoothing filter.

2. The apparatus of claim 1, wherein the defined size is 32.

3. The apparatus of claim 1, wherein the block size of the rectangular PU is at least one of 64, 256, or 1024.

4. The apparatus of claim 1, wherein the plurality of conditions further comprise the block size of the rectangular PU not being less than the defined size.

5. The apparatus of claim 4, wherein the defined size is 64.

6. The apparatus of claim 4, wherein the block size of the rectangular PU is at least one of 64, 256, or 1024.

7. The apparatus of claim 1, wherein the plurality of conditions further comprise the block size of the rectangular PU being equal to a block size of a square block.

8. The apparatus of claim 1, wherein the processor further executes the computer instructions to perform the step of:
    determine whether to apply the intra smoothing filter while performing the intra prediction processing for the rectangular PU based on a reference filter strategy, wherein the same reference filter strategy is applied to both a rectangular block and a square block.

9. The apparatus of claim 8, wherein the same reference filter strategy is applied to both the rectangular block and the square block based on a block size.

10. The apparatus of claim 8, wherein the rectangular block and the square block have a same block size.

11. The apparatus of claim 8, wherein a block size of the rectangular block is at least one of 4×16, 16×4, 2×32, or 32×2 and a block size of the square block is 8×8, or wherein the block size of the rectangular block is at least one of 8×32 or 32×8 and the block size of the square block is 16×16.

12. The apparatus of claim 1, wherein the plurality of conditions further comprises a width of the rectangular PU being the same as a width of a square PU included in a lookup table (LUT).

13. A method implemented by a processor, comprising:
    determining, by the processor, whether a plurality of conditions are satisfied, the plurality of conditions comprising a block size of a rectangular prediction unit (PU) being greater than a defined size;
    determining, by the processor, whether to use an intra smoothing filter for the rectangular PU based on whether the plurality of conditions are satisfied, wherein a width of the rectangular PU is different from a height of the rectangular PU; and
    applying, by the processor, the intra smoothing filter while performing intra prediction processing for the rectangular PU in response to determining to use the intra smoothing filter.

14. The method of claim 13, wherein the defined size is 32.

15. The method of claim 13, wherein the block size of the rectangular PU is at least one of 64, 256, or 1024.

16. The method of claim 13, wherein the plurality of conditions further comprise the block size of the rectangular PU not being less than the defined size.

17. The method of claim 16, wherein the defined size is 64.

18. The method of claim 16, wherein the block size of the rectangular PU is at least one of 64, 256, or 1024.

19. The method of claim 13, wherein the plurality of conditions further comprise the block size of the rectangular PU being equal to a block size of a square block.

20. The method of claim 13, further comprising determining whether to apply the intra smoothing filter while performing the intra prediction processing for the rectangular PU based on a reference filter strategy, wherein the same reference filter strategy is applied to both a rectangular block and a square block.

21. The method of claim 20, wherein the same reference filter strategy is applied to both the rectangular block and the square block based on a block size.

22. The method of claim 20, wherein the rectangular block and the square block have a same block size.

23. The method of claim 13, wherein the plurality of conditions further comprises a condition associated with a component of color space.

24. The method of claim 20, wherein a block size of the rectangular block is at least one of 4×16, 16×4, 2×32, or 32×2 and a block size of the square block is 8×8, or wherein the block size of the rectangular block is at least one of 8×32 or 32×8 and the block size of the square block is 16×16.

25. A non-transitory computer readable medium, comprising instructions executable by a processor such that, when executed, causes the processor to perform the following steps:
   determine whether a plurality of conditions are satisfied, the plurality of conditions comprising a block size of a rectangular prediction unit (PU) being greater than a defined size;
   determine whether to use an intra smoothing filter for the rectangular PU based on whether the plurality of conditions are satisfied, wherein a width of the rectangular PU is different from a height of the rectangular PU; and
   apply the intra smoothing filter while performing intra prediction processing for the rectangular PU in response to determining to use the intra smoothing filter.

26. The non-transitory computer readable medium of claim 25, wherein the defined size is 32.

27. The non-transitory computer readable medium of claim 25, wherein the block size of the rectangular PU is at least one of 64, 256, or 1024.

28. The non-transitory computer readable medium of claim 27, wherein the defined size is 64.

29. The non-transitory computer readable medium of claim 27, wherein the block size of the rectangular PU is at least one of 64, 256, or 1024.

30. The non-transitory computer readable medium of claim 25, wherein the plurality of conditions further comprise the block size of the rectangular PU not being less than the defined size.

31. The non-transitory computer readable medium of claim 25, wherein the plurality of conditions further comprise the block size of the rectangular PU being equal to a block size of a square block.

32. The non-transitory computer readable medium of claim 31, wherein the same reference filter strategy is applied to both the rectangular block and the square block based on a block size.

33. The non-transitory computer readable medium of claim 31, wherein the rectangular block and the square block have a same block size.

34. The non-transitory computer readable medium of claim 31, wherein a block size of the rectangular block is at least one of 4×16, 16×4, 2×32, or 32×2 and a block size of the square block is 8×8, or wherein the block size of the rectangular block is at least one of 8×32 or 32×8 and the block size of the square block is 16×16.

35. The non-transitory computer readable medium of claim 25, wherein the instructions further cause the processor to perform the step of:
   determine whether to apply the intra smoothing filter while performing the intra prediction processing for the rectangular PU based on a reference filter strategy, wherein the same reference filter strategy is applied to both a rectangular block and a square block.

* * * * *